United States Patent
Ma et al.

(10) Patent No.: US 11,347,337 B2
(45) Date of Patent: May 31, 2022

(54) TRANSPARENT CONDUCTIVE STRUCTURE AND PREPARATION METHOD THEREOF, DISPLAY SUBSTRATE AND TOUCH SUBSTRATE

(71) Applicants: Hefei Xinsheng Optoelectronics Technology Co., Ltd., Hefei (CN); BOE TECHNOLOGY GROUP CO., LTD., Beijing (CN)

(72) Inventors: Tao Ma, Beijing (CN); Chaowei Hao, Beijing (CN); Yanbo Chen, Beijing (CN)

(73) Assignees: Hefei Xinsheng Optoelectronics Technology Co., Ltd., Hefei (CN); BOE TECHNOLOGY GROUP CO., LTD, Beijing (CN)

( * ) Notice: Subject to any disclaimer, the term of this patent is extended or adjusted under 35 U.S.C. 154(b) by 0 days.

(21) Appl. No.: 16/963,902

(22) PCT Filed: Feb. 10, 2020

(86) PCT No.: PCT/CN2020/074633
§ 371 (c)(1),
(2) Date: Jul. 22, 2020

(87) PCT Pub. No.: WO2020/181940
PCT Pub. Date: Sep. 17, 2020

(65) Prior Publication Data
US 2021/0216156 A1    Jul. 15, 2021

(30) Foreign Application Priority Data
Mar. 12, 2019    (CN) .......................... 201910184748.4

(51) Int. Cl.
*G06F 3/041*    (2006.01)
*H01B 5/14*    (2006.01)
*G06F 3/045*    (2006.01)

(52) U.S. Cl.
CPC ............ *G06F 3/0412* (2013.01); *G06F 3/045* (2013.01); *H01B 5/14* (2013.01); *G06F 2203/04103* (2013.01)

(58) Field of Classification Search
CPC ...... H01L 27/1285; H01L 33/42; C08J 7/043; G06F 3/045; H01B 1/22
(Continued)

(56) References Cited

U.S. PATENT DOCUMENTS

2008/0292826 A1    11/2008    Tanabe et al.
2010/0062555 A1*    3/2010    Hwang ............... H01L 27/1285
                                                    438/30
(Continued)

FOREIGN PATENT DOCUMENTS

CN    101311889 A    11/2008
CN    101853101 A    10/2010
(Continued)

OTHER PUBLICATIONS

International Search Report and Written Opinion for International Application No. PCT/CN2020/074633 dated May 9, 2020.
(Continued)

*Primary Examiner* — Abdul-Samad A Adediran
(74) *Attorney, Agent, or Firm* — Thomas | Horstemeyer LLP

(57) ABSTRACT

The present disclosure provides a transparent conductive structure and a preparation method thereof, a display substrate, and a touch substrate, which belongs to the technical field of display panels. The transparent conductive structure is provided on a substrate. The method for manufacturing a
(Continued)

transparent conductive structure includes: providing the substrate; forming a transparent conductive layer on the substrate; forming a heat insulation layer on a surface of the transparent conductive layer away from the substrate, the heat insulation layer having at least one window region exposing the transparent conductive layer; heating the transparent conductive layer for a preset time period, to form at least one insulating region on the transparent conductive layer; and removing the heat insulation layer.

16 Claims, 4 Drawing Sheets

(58) Field of Classification Search
USPC .............. 252/514; 257/98; 338/47; 345/173; 438/30
See application file for complete search history.

(56) References Cited

U.S. PATENT DOCUMENTS

| | | | | |
|---|---|---|---|---|
| 2010/0295086 | A1* | 11/2010 | Shinohara | H01L 33/42 257/98 |
| 2012/0015098 | A1 | 1/2012 | Cheng et al. | |
| 2013/0241689 | A1* | 9/2013 | Nakajima | C08J 7/043 338/47 |
| 2015/0315391 | A1* | 11/2015 | Eckert | H01B 1/22 252/514 |
| 2016/0195948 | A1* | 7/2016 | Tomohisa | G06F 3/045 345/173 |
| 2019/0206586 | A1 | 7/2019 | Guo | |

FOREIGN PATENT DOCUMENTS

| | | |
|---|---|---|
| CN | 102337054 A | 2/2012 |
| CN | 103258596 A | 8/2013 |
| CN | 103703519 A | 4/2014 |
| CN | 105677092 A | 6/2016 |
| CN | 106019678 A | 10/2016 |
| CN | 106104444 A | 11/2016 |
| CN | 108597648 A | 9/2018 |
| CN | 109933239 A | 6/2019 |
| JP | 2012204023 A | 10/2012 |
| JP | 2015018624 A | 1/2015 |
| TW | 201515023 A | 4/2015 |
| TW | I508104 B | 11/2015 |
| WO | 2012127915 A1 | 9/2012 |
| WO | 2015005332 A1 | 1/2015 |

OTHER PUBLICATIONS

First Office Action for CN Patent Application No. 201910184748.4 dated Apr. 9, 2020.
Second Office Action for CN Patent Application No. 201910184748.4 dated Oct. 30, 2020.

* cited by examiner

TRANSPARENT CONDUCTIVE STRUCTURE AND PREPARATION METHOD THEREOF, DISPLAY SUBSTRATE AND TOUCH SUBSTRATE

CROSS-REFERENCE OF RELATED APPLICATIONS

The present application is a 35 U.S.C. § 371 national phase application of International Patent Application No. PCT/CN2020/074633 filed Feb. 10, 2020, which claims the benefit of and priority to Chinese Patent Application No. 201910184748.4, filed on Mar. 12, 2019, the contents of which being incorporated by reference in their entireties herein.

TECHNICAL FIELD

The present disclosure relates to the technical field of display panels and, in particular, to a transparent conductive structure and a preparation method thereof, a display substrate, and a touch substrate.

BACKGROUND

A transparent conductive pattern is an important component on a display substrate or a touch substrate, and is widely used as an electrode or a wiring.

During preparation of the transparent conductive pattern, a transparent conductive film is generally formed on a substrate first and thereafter, a part of the transparent conductive film is removed through etching to expose the substrate. The remaining transparent conductive film becomes the transparent conductive pattern.

The above information disclosed in the background section is only for enhancing the understanding of the background of the present disclosure, so it may include information that does not constitute prior art known to those of ordinary skill in the art.

SUMMARY

The present disclosure aims to provide a transparent conductive structure and a preparation method thereof, a display substrate, and a touch substrate.

The present disclosure adopts following technical solutions.

According to a first aspect of the present disclosure, there is provided a method for manufacturing a transparent conductive structure, wherein the transparent conductive structure is provided on a substrate; the method including:
  providing the substrate;
  forming a transparent conductive layer on the substrate;
  forming a heat insulation layer on a surface of the transparent conductive layer away from the substrate, the heat insulation layer having at least one window region exposing the transparent conductive layer;
  heating the transparent conductive layer for a preset time period, to form at least one insulating region on the transparent conductive layer; and
  removing the heat insulation layer.

In an exemplary embodiment of the present disclosure, a material of the transparent conductive layer is a transparent conductive metal oxide.

In an exemplary embodiment of the present disclosure, the transparent conductive metal oxide is indium tin oxide, indium zinc oxide, or indium gallium zinc oxide.

In an exemplary embodiment of the present disclosure, a material of the heat insulation layer is a photoresist.

In an exemplary embodiment of the present disclosure, the photoresist is a phenolic resin photoresist.

In an exemplary embodiment of the present disclosure, an orthographic projection of each window region on the substrate is located within an orthographic projection of each insulating region on the substrate;
  an edge of any of the insulating regions exceeds an edge of its corresponding window region by 0 micron to 0.9 microns.

In an exemplary embodiment of the present disclosure, the substrate is a heat insulation substrate.

In an exemplary embodiment of the present disclosure, the heat insulation layer has a heat insulation pattern, and the heat insulation pattern covers at least a part of the transparent conductive layer.

In an exemplary embodiment of the present disclosure, the heat insulation pattern and the window region are complementary patterns.

According to a second aspect of the present disclosure, there is provided a transparent conductive structure, including:
  a transparent conductive pattern, made of a transparent conductive material;
  an insulating pattern, provided on the same layer as the transparent conductive pattern and being complementary with the transparent conductive pattern, and prepared by heating the transparent conductive material for a preset time period.

In an exemplary embodiment of the present disclosure, the transparent conductive material is a transparent conductive metal oxide.

According to a third aspect of the present disclosure, there is provided a display substrate, including the transparent conductive structure described above.

According to a fourth aspect of the present disclosure, there is provided a touch substrate, including the transparent conductive structure described above.

It should be understood that the above general description and the following detailed description are only exemplary and explanatory, and do not limit the present disclosure.

This section provides an overview of various implementations or examples of the technology described in this disclosure, and is not a comprehensive disclosure of the full scope or all features of the disclosed technology.

BRIEF DESCRIPTION OF THE DRAWINGS

The above and other features and advantages of the present disclosure will become more apparent by describing example embodiments thereof in detail with reference to the drawings.

DETAILED DESCRIPTION

Figure 1:
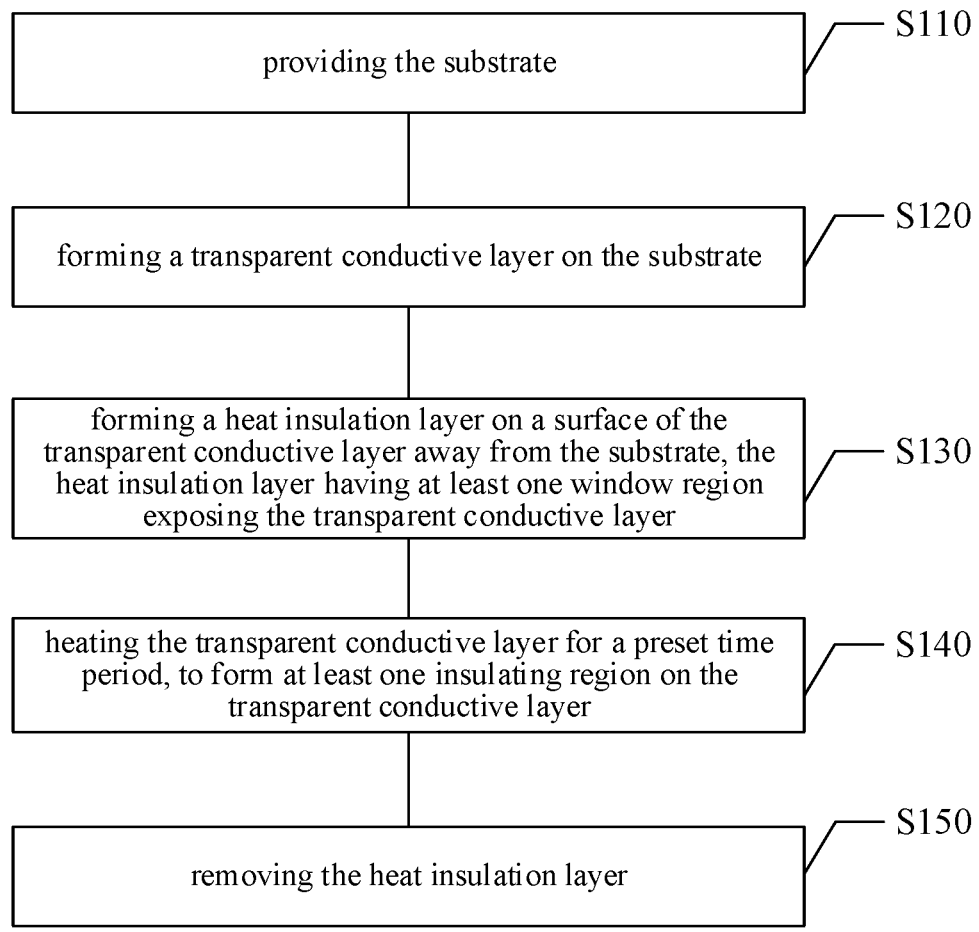
FIG. 1 is a schematic flowchart of a method for manufacturing a transparent conductive structure according to an embodiment of the present disclosure.

Example embodiments will now be described more fully with reference to the drawings. However, the example embodiments can be implemented in various forms and should not be construed as being limited to the examples set forth herein; on the contrary, these embodiments are provided to make the present disclosure more comprehensive and complete, and fully convey the idea of the example embodiments to those skilled in the art. The described features, structures, or characteristics may be combined in one or more embodiments in any suitable manner. In the following description, many specific details are provided to give a full understanding of the embodiments of the present disclosure.

In the drawings, the region and layer thicknesses may be exaggerated for clarity. The same reference numerals in the drawings denote the same or similar structures, and thus their detailed description will be omitted.

The described features, structures, or characteristics may be combined in one or more embodiments in any suitable manner. In the following description, many specific details are provided to give a full understanding of the embodiments of the present disclosure. However, those skilled in the art will realize that the technical solutions of the present disclosure may be practiced without one or more of the specific details, or other methods, components, materials, etc. may be used. In other cases, well-known structures, materials, or operations are not shown or described in detail to avoid obscuring the main technical idea of the present disclosure.

Figure 2:
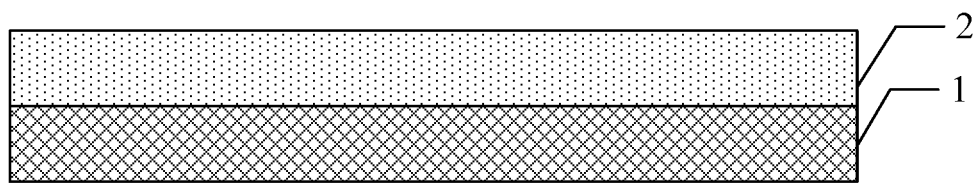
FIG. 2 is a schematic diagram of forming a transparent conductive layer on a substrate in an embodiment of the present disclosure.
Figure 3:
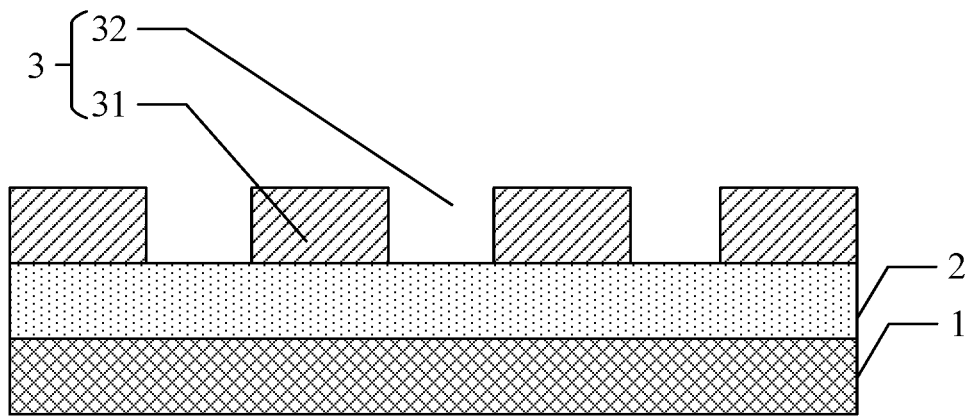
FIG. 3 is a schematic diagram of forming a heat insulation layer on a transparent conductive layer in an embodiment of the present disclosure.
Figure 4:
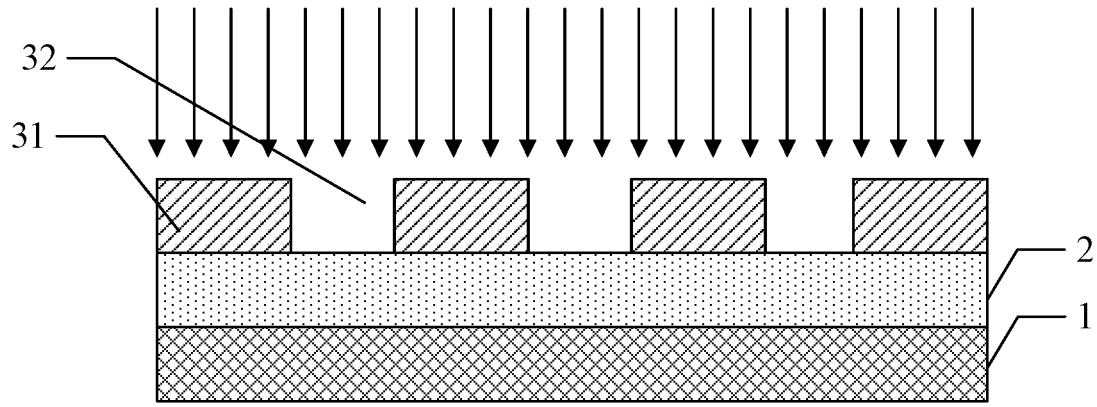
FIG. 4 is a schematic diagram of heating a transparent conductive layer in an embodiment of the present disclosure.
Figure 5:
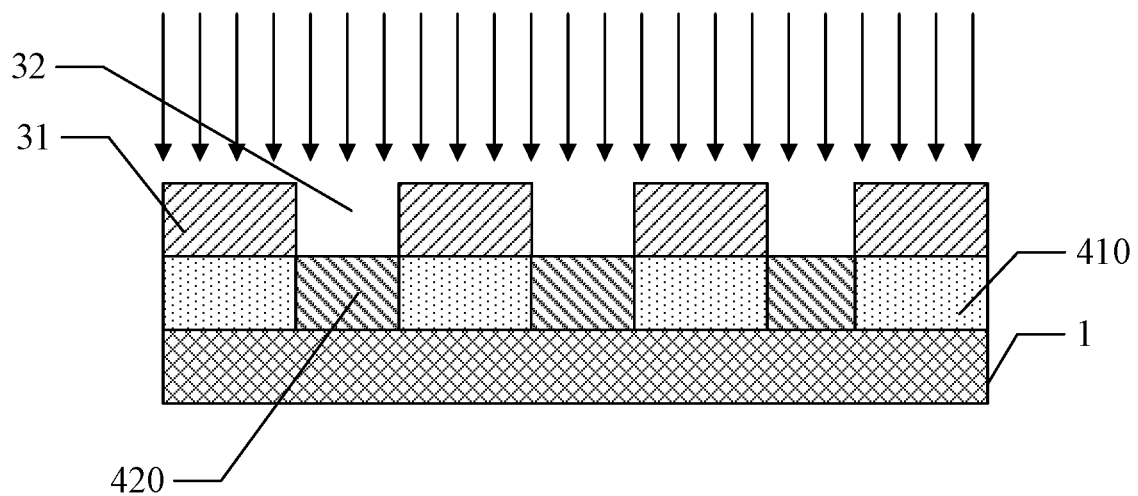
FIG. 5 is a schematic diagram of forming an insulating region on a transparent conductive layer in an embodiment of the present disclosure.
Figure 6:
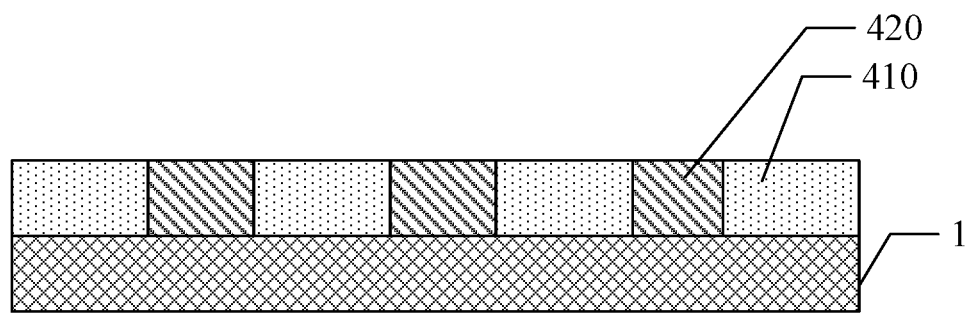
FIG. 6 is a schematic diagram of removing the heat insulation layer in the embodiment of the present disclosure.

An embodiment of the present disclosure provides a method for manufacturing a transparent conductive structure. The transparent conductive structure is provided on a substrate 1, as shown in FIGS. 1-7. The method for manufacturing the transparent conductive structure includes:

S110, providing the substrate 1;

S120, forming a transparent conductive layer 2 on the substrate 1 (as shown in FIG. 2);

S130, forming a heat insulation layer 3 on a surface of the transparent conductive layer 2 away from the substrate 1, the heat insulation layer 3 having at least one window region 32 exposing the transparent conductive layer 2 (as shown in FIG. 3);

S140, heating the transparent conductive layer 2 for a preset time period, to form at least one insulating region 420 on the transparent conductive layer 2 (as shown in FIGS. 4 and 5);

S150, removing the heat insulation layer 3 (as shown in FIG. 6).

In the method of manufacturing the transparent conductive structure provided by the present disclosure, a heat insulation layer 3 is formed on the surface of the transparent conductive layer 2 firstly and then, the transparent conductive layer 2 is heated. Due to shielding of the heat insulation layer 3, the covered portion of the transparent conductive layer 2 has a slow temperature rising speed and can maintain a relatively low temperature. Therefore, the covered portion of the transparent conductive layer 2 still maintains good conductivity and eventually becomes a transparent conductive region 410 on the transparent conductive structure. The part of the transparent conductive layer 2 corresponding to the window region 32 is not covered, so its temperature rises rapidly and maintains a high temperature state, thus, its crystal structure will change resulting in a decrease in its conductive performance and eventually having insulativity. The portion of the transparent conductive layer 2 corresponding to the window region 32 eventually becomes an insulating region 420 on the transparent conductive structure after the heat treatment. Therefore, the manufacturing method of the transparent conductive structure provided by the present disclosure does not require etching the transparent conductive layer 2 and does not expose the substrate 1. The difference in reflectivity between the substrate 1 and the transparent conductive layer 2 does not cause a visual difference, so that the transparent conductive structure prepared by the method is more uniform visually, which improves the quality of the display substrate or touch substrate applying the transparent conductive structure. Not only that, the manufacturing method of the transparent conductive structure does not require etching, which can save materials such as the etching liquid and reduce the manufacturing cost of the transparent conductive structure.

The steps of the method for manufacturing the transparent conductive structure provided by the embodiments of the present disclosure will be described in detail below with reference to the drawings.

In step S110, the provided substrate 1 may be various, including but not limited to a base substrate, a functional film layer, an insulating layer, and other structures. It can be understood that both flat and uneven structures used to form the transparent conductive layer 2 can be regarded as the substrate 1 of the present disclosure.

For example, in one embodiment, the substrate 1 may be a base film of a touch substrate, and the transparent conductive layer 2 may be formed on the base film and prepared to be a transparent conductive structure according to the transparent conductive structure preparation method provided by the present disclosure. The transparent conductive region 410 of the transparent conductive structure can be used as a sensing electrode or/and a driving electrode of the touch substrate. It can be understood that when a black matrix layer, an insulating layer, an extinction layer, and other hierarchical structures are provided between the base film and the transparent conductive layer 2, all the structures provided between the base film and the transparent conductive layer 2 are a part of the substrate 1.

It can be understood that, as shown in FIGS. 2 and 4, the substrate 1 is not only used to form the transparent conductive layer 2, the substrate 1 can also block one side of the transparent conductive layer 2, which reduces the heat conduction speed from the side of the substrate 1 to the transparent conductive layer 2. In this way, the transparent conductive layer 2 is mainly heated by the side on which the heat insulation layer 3 is provided, thereby ensuring that the heat insulation layer 3 determines the temperature rising speed and final temperature of different regions of the transparent conductive layer 2.

As shown in FIG. 2, in step S120, a transparent conductive layer 2 is formed on the substrate 1. The material of the transparent conductive layer 2 may be an inorganic material, an organic material, or a mixture of inorganic and organic materials which is transparent and conductive. For example, the material of the transparent conductive layer 2 may be a transparent conductive metal oxide, such as one or more oxides of metals such as In, Zn, Sb, and Cd. In one embodiment, the transparent conductive layer 2 may be made of indium tin oxide (ITO), indium zinc oxide (IZO), indium gallium zinc oxide (IGZO), or the like.

The transparent conductive layer 2 can select appropriate preparation methods according to specific process conditions. The preparation methods include, but are not limited to, a sputtering method, an evaporation method, a sol-gel method, a screen printing method, and an inkjet printing method, or the like.

As shown in FIG. 3, in step S130, a heat insulation layer 3 is formed on a surface of the transparent conductive layer 2 away from the substrate 1. The heat insulation layer 3 may include at least one heat insulation portion 31, and at least one window region 32 exists between the heat insulation portions 31. The heat insulation portion 31 covers the transparent conductive layer 2 to reduce the temperature rising speed of the transparent conductive layer 2 covered by the heat insulation portion 31. The window region 32 is used to expose the transparent conductive layer 2, so that the exposed transparent conductive layer 2 rapidly heats up. The pattern of the heat insulation portion 31 (that is, the pattern of the heat insulation layer 3) composed of all the heat insulation portions 31 is complementary with the pattern of the window region 32 composed of all the window regions 32, to form the heat insulation layer 3 at least covering the transparent conductive layer 2.

It can be understood that the window region 32 may be a blank region provided between the heat insulation portions 31.

The material of the heat insulation layer 3 (that is, the material of the heat insulation portion 31) may have a low thermal conductivity coefficient, so as to reduce the temperature rising speed of the portion of the transparent conductive layer 2 covered by the heat insulation layer 3, to avoid the portion of the transparent conductive layer 2 covered by layer 3 being insulated at a high temperature. The material of the heat insulation layer 3 may also have excellent high temperature resistance, and it will not deform significantly during the heating, and in particular, it will not cause the pattern of the window region 32 exposing the transparent conductive layer 2 to change.

It can be understood that in addition to selecting different materials of the heat insulation layer 3 to ensure the heat insulation effect, the technician can also increase the thickness of the heat insulation layer 3 to improve the heat insulation effect.

As shown in FIG. 3, the pattern of the heat insulation layer 3 (that is, the pattern of the heat insulation portion 31) may have a preset pattern. Since the pattern of the window region 32 is complementary with the pattern of the heat insulation portion 31, the pattern of the window region 32 may be acquired based on the preset pattern.

In one embodiment, a method of screen printing, inkjet printing, etc. may be used to directly form a heat insulation layer 3 with a predetermined pattern on the transparent conductive layer 2, and the window region 32 is formed on the portion of the transparent conductive layer 2 where the heat insulation layer 3 is not provided. In another embodiment, a heat insulation film can be formed on the transparent conductive layer 2 firstly, and then a window layer can be formed by removing a part of the heat insulation film, and the remaining heat insulation film can have a predetermined pattern. The remaining heat insulation film serves as the heat insulation portion 31. Of course, the technician can also choose other preparation methods according to the material used by the heat insulation layer 3.

For example, the material of the heat insulation layer 3 may be a photoresist, and a technician can prepare the heat insulation layer 3 through a mask process. For example, a layer of photoresist can be coated on the transparent conductive layer 2 firstly, and then a photoresist layer with a preset pattern can be obtained through exposure and development. The photoresist layer serves as a heat insulation layer 3 to protect the covered transparent conductive layer 2 from being heated. It can be understood that, according to different preset patterns, a technician can select a corresponding mask plate and a positive photoresist or a negative photoresist.

A photoresist with good high temperature resistance can be selected, especially a photoresist that is not easy to flow when heated can be selected, to ensure that the formed protective layer is stable and not deformed at the high temperature, and to ensure that the pattern of the protective layer is stable when the transparent conductive layer is heated. In one embodiment, the high temperature resistance of the selected photoresist may be tested firstly, to ensure the high temperature resistance performance of the selected photoresist. The photoresist generally includes solvents, resins, sensitizers, and additives. The resin used to form the photoresist of the heat insulation layer 3 may have a large molecular weight. The molecular weight and distribution of the resin have a great influence on the pressure resistance and temperature resistance of the photoresist. The photoresist with a small resin molecular weight has weak cohesion, is prone to missing patterns during high-pressure processing, has poor corrosion resistance, poor temperature resistance, flows easily when heated, and the graphics are easily distorted. The photoresist with a large resin molecular weight has strong cohesion and high impact pressure after film formation. During the baking process, the hot Brownian motion cannot make the resin molecules with large molecular weight flow, the van der Waals force is weak and the temperature resistance is high. In one embodiment, the molecular weight of the resin in the selected photoresist may be not less than 10800. The resin of the photoresist may also have a low thermal conductivity coefficient, so as to minimize the thermal conductivity coefficient of the heat insulation layer 3.

In one embodiment, the photoresist may select a phenolic resin photoresist.

It can be understood that, during heating, the temperature rising speed of the edge region of the portion of the transparent conductive layer 2 covered by the heat insulation portion 31, especially the edge region connected to the portion of the transparent conductive layer 2 corresponding to the window region 32, will be higher than the inner region of the portion of the transparent conductive layer 2 covered by the heat insulation portion 31. Therefore, after the processing in step S140, the square resistance of the edge region will be significantly higher than that of the transparent conductive region 410, and may exhibit semi-insulating or insulating properties. The edge region may not serve as the transparent conductive region 410, but as a part of the insulating region 420. Therefore, each insulating region 420 corresponds to each window region 32 one by one, which does not mean that the corresponding insulating region 420 completely overlaps with the window region 32. In other words, according to an embodiment of the present disclosure, the orthographic projection of each window region 32 on the substrate is within the orthographic projection of each insulating region 420 on the substrate.

In order to ensure the accuracy of the size of the transparent conductive region 410, the preset pattern of the heat insulation layer 3 may be designed according to the expected pattern of the transparent conductive region 410. For example, the pattern of the insulating region 420 can be designed according to the expected pattern of the transparent conductive region 410 by a complementary method, then the pattern of the window region 32 can be designed according to the pattern of the insulating region 420, and then the preset pattern of the heat insulation layer 3 can be designed according to the complementary method. In one embodiment, the edge of the insulating region 420 exceeds the edge of the corresponding window region 32 by 0 to 0.9 microns.

As shown in FIG. 4, in step S140, the substrate 1 carrying the transparent conductive layer 2 may be under a preset temperature for a preset time period, to heat the transparent conductive layer 2.

The preset temperature may be higher than 500° C., so that the portion of the transparent conductive layer 2 corresponding to the window region 32 can be heated to above 500° C., to achieve insulation. The technician can choose appropriate heating temperature according to process requirements. For example, in one embodiment, the heating temperature may be 550~650° C.

The preset time period may be 30~60 min, to ensure that the portion of the transparent conductive layer 2 corresponding to the window region 32 can be insulated, and to avoid excessively long time leading to an increase in the square resistance of the portion of the transparent conductive layer 2 covered by the insulating layer 3. It can be understood that, after the crystal form of the portion of the transparent conductive layer 2 corresponding to the window region 32 has been completely changed, it cannot effectively continue to reduce the square resistance of the transparent conductive layer 2 corresponding to the window region 32 by continuing to prolong the heating time.

Figure 9:
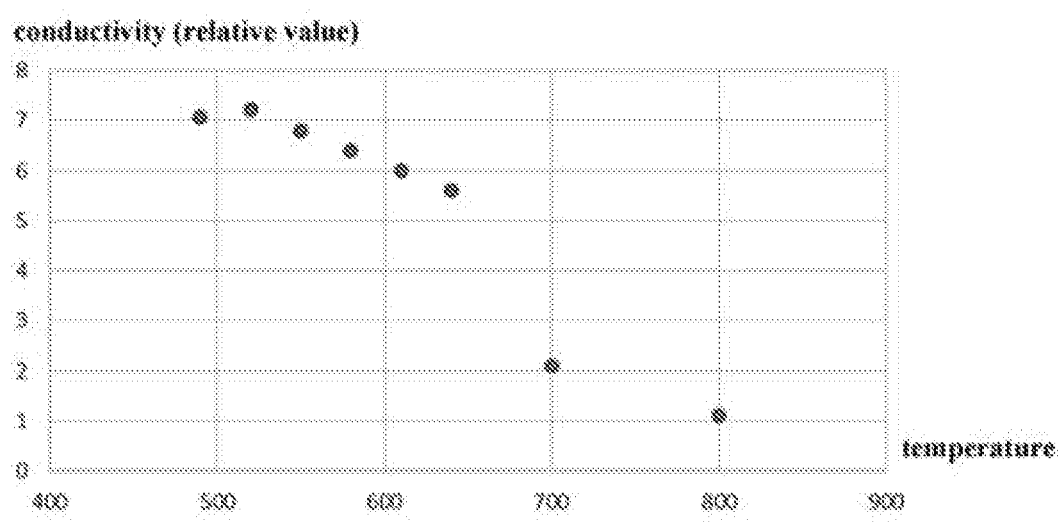
FIG. 9 is a schematic diagram of change of square resistance after continuous heating of ITO at different temperatures.

A high-temperature test can be performed on the material of the transparent conductive layer 2 in advance, and the change rule of the square resistance of the material of the transparent conductive layer 2 under high-temperature conditions can be observed, and a reasonable preset time period and preset temperature can be set accordingly. For example, FIG. 9 is a schematic diagram of the change of square resistance after continuous heating of ITO under different temperatures. According to the graph and test verification, when the material of the transparent conductive layer 2 is ITO, the preset temperature is about 600° C., and the preset time period is 30~60 min.

As shown in FIG. 5, during the heating process, the portion of the transparent conductive layer 2 corresponding to the window region 32 has a rapid temperature rising speed and a high temperature, and finally becomes an insulating region 420. The portion of the transparent conductive layer 2 covered by the heat insulation layer 3 has a slow temperature rising speed and a low temperature, and maintains conductivity, and finally becomes the transparent conductive region 410.

It can be understood that, since the material of the insulating region 420 is the same as that of the transparent conductive region 410, and the difference between the insulating region 420 and the transparent conductive region 410 mainly lies in the difference in resistance due to the difference in lattice integrity. Therefore, the insulating region 420 may also exhibit the transparent characteristic, so that the entire transparent conductive structure is a transparent structure.

It should be noted that although the steps of the method in the present disclosure are described in a specific order in the drawings, this does not require or imply that the steps must be performed in the specific order, or all the steps shown must be performed to achieve the desired result. Additionally or alternatively, certain steps may be omitted, multiple steps may be combined into one step for execution, and/or one step may be decomposed into multiple steps for execution, etc., all of which should be considered as a part of the present disclosure.

Figure 7:
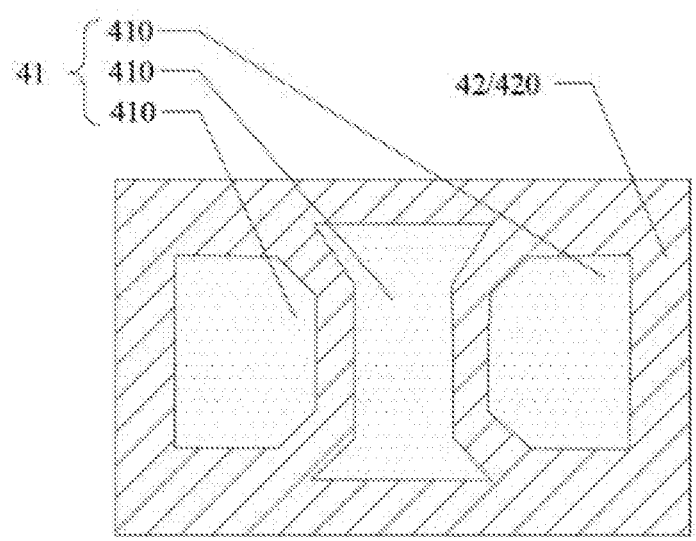
FIG. 7 is a schematic diagram of a transparent conductive structure according to an embodiment of the present disclosure.

The present disclosure further provides a transparent conductive structure. As shown in FIG. 7, the transparent conductive structure includes a transparent conductive pattern 41 and an insulating pattern 42. The transparent conductive pattern 41 is made of a transparent conductive material. The insulating pattern 42 is provided on the same layer as the transparent conductive pattern 41 and being complementary with the transparent conductive pattern 41, and prepared by heating the transparent conductive material for a preset time period.

The transparent conductive structure is composed of transparent conductive patterns 41 and insulating patterns 42 complementary with the transparent conductive patterns 41, so it has a complete film structure. The crystal structure integrity of the transparent conductive material is destroyed under heating conditions and the transparent conductive material is transformed into an insulating material. Therefore, the composition of materials of the insulating region 420 and the transparent conductive region 410 are consistent, and crystal structures of the insulating region 420 and the transparent conductive region 410 only has differences on the lattice integrity or local change of the crystal form. Therefore, optical characteristics such as the reflectivity of the insulating region 420 and the transparent conductive region 410 are basically the same, which ensures that the transparent conductive structure has a relatively uniform reflectivity, and avoids a significant difference in vision.

Figure 8:
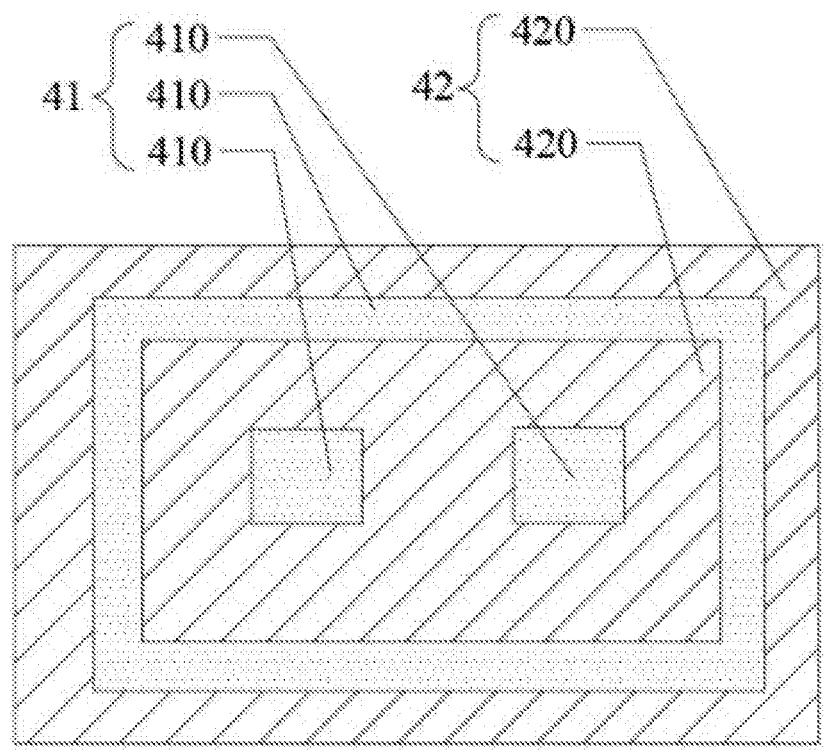
FIG. 8 is a schematic diagram of a transparent conductive structure according to another embodiment of the present disclosure.

It can be understood that the transparent conductive pattern 41 may be a whole continuous region, or may also include a plurality of mutually separated transparent conductive regions 410 separated by the insulating pattern 42 (as shown in FIGS. 7 and 8). In one embodiment, the transparent conductive pattern 41 includes a plurality of transparent conductive regions 410 separated from each other, and a distance between two adjacent transparent conductive regions 410 is not less than 8 μm.

The insulating pattern 42 may be an entire continuous region (as shown in FIG. 7), or may also include a plurality of mutually separated insulating regions 420 separated by the transparent conductive pattern 41 (as shown in FIG. 8).

The transparent conductive structure can be disposed on a substrate 1, wherein the transparent conductive region 410 can be used as a functional component such as an electrode or a wiring.

The transparent conductive material may be the same as the transparent conductive material described in the above embodiment of the method for manufacturing a transparent conductive structure, which will not be repeated in this disclosure.

In an embodiment, the transparent conductive structure provided by the present disclosure may be prepared by the method provided in the above-mentioned method for manufacturing a transparent conductive structure, which will not be repeated in this disclosure. It can be understood that the technician can also select other methods to prepare the transparent conductive structure according to structural characteristics of the transparent conductive structure.

Embodiments of the present disclosure further provide a display substrate including the transparent conductive structure described in the above transparent conductive structure embodiment, so the display substrate has the same beneficial effects as the transparent conductive structure described in the above transparent conductive structure embodiment, which will not be repeated in this disclosure.

The display substrate may be an array substrate, a color filter substrate, etc., which is not specifically limited in this disclosure. The transparent conductive pattern 41 of the transparent conductive structure may be electrodes, wirings, etc. in the display substrate. When the display substrate is an array substrate with a touch function or a color filter substrate with a touch function, the transparent conductive structure can also be used as a touch electrode of the display substrate.

An embodiment of the present disclosure further provides a touch substrate including the transparent conductive structure described in the above transparent conductive structure embodiment, so that the touch substrate has the same beneficial effects as the transparent conductive structure described in the above transparent conductive structure embodiment, which will not be repeated in this disclosure.

The touch substrate may be a capacitive touch substrate, a resistive touch substrate, or other touch substrates, which is not specifically limited in this disclosure.

In the manufacturing method of the transparent conductive structure provided by the present disclosure, a heat insulation layer is formed on the surface of the transparent conductive layer firstly, and then the transparent conductive layer is heated. Due to shielding of the heat insulation layer, the covered portion of the transparent conductive layer has a slow temperature rising speed and can maintain a relatively low temperature. Therefore, the covered portion of the transparent conductive layer still maintains good conductivity and eventually becomes a transparent conductive region on the transparent conductive structure. The part of the transparent conductive layer corresponding to the window region is not covered, and thus its temperature rises rapidly and maintains a high temperature state, and its crystal structure will change, resulting in a reduction in its conductive performance and it eventually has insulativity. The part of the transparent conductive layer corresponding to the window region finally becomes a transparent insulating region on the transparent conductive structure after the heat treatment. Therefore, the manufacturing method of the transparent conductive structure provided by the present disclosure does not require etching the transparent conductive layer and does not expose the substrate; the difference in reflectivity between the substrate and the transparent conductive layer does not cause a visual difference, so that the transparent conductive structure prepared by the method is more uniform visually, which improves the quality of the display substrate or touch substrate applying the transparent conductive structure. Not only that, the manufacturing method of the transparent conductive structure does not require etching, which can save materials such as the etching liquid, and reduce the manufacturing cost of the transparent conductive structure.

It should be understood that this disclosure does not limit its application to the detailed structure and arrangement of the components proposed in this specification. The present disclosure can have other embodiments, and can be implemented and executed in various ways. The aforementioned modified forms and altered forms fall within the scope of the present disclosure. It should be understood that the disclosure disclosed and defined in this specification extends to all alternative combinations of two or more individual features mentioned or evident in the text and/or drawings. All of these different combinations constitute various alternative aspects of the present disclosure. The embodiments described in this specification illustrate the best modes known for implementing the present disclosure, and will enable those skilled in the art to utilize the present disclosure.

What is claimed is:

1. A method for manufacturing a transparent conductive structure provided on a substrate, comprising:
providing the substrate;
forming a transparent conductive layer on the substrate;
forming a heat insulation layer on a surface of the transparent conductive layer away from the substrate, the heat insulation layer having at least one window region exposing the transparent conductive layer;
heating the transparent conductive layer for a preset time period to form at least one insulating region on the transparent conductive layer; and
removing the heat insulation layer, wherein:
an orthographic projection of each window region on the substrate is located within an orthographic projection of each insulating region on the substrate; and
an edge of any of the insulating regions exceeds an edge of a corresponding window region by 0 micron to 0.9 microns.

2. The method for manufacturing the transparent conductive structure according to claim 1, wherein a material of the transparent conductive layer is a transparent conductive metal oxide.

3. The method for manufacturing the transparent conductive structure according to claim 2, wherein the transparent conductive metal oxide is indium tin oxide, indium zinc oxide, or indium gallium zinc oxide.

4. The method for manufacturing the transparent conductive structure according to claim 1, wherein a material of the heat insulation layer is a photoresist.

5. The method for manufacturing the transparent conductive structure according to claim 4, wherein the photoresist is a phenolic resin photoresist.

6. The method for manufacturing the transparent conductive structure according to claim 1, wherein the substrate is a heat insulation substrate.

7. The method for manufacturing the transparent conductive structure according to claim 1, wherein the heat insulation layer has a heat insulation pattern, and the heat insulation pattern covers at least a part of the transparent conductive layer.

8. The method for manufacturing the transparent conductive structure according to claim 7, wherein the heat insulation pattern and a window region are complementary patterns.

9. The method for manufacturing the transparent conductive structure according to claim 1, wherein the transparent conductive layer is heated at a temperature of 550 to 650° C.

10. The method for manufacturing the transparent conductive structure according to claim 1, wherein the preset time period is 30 to 60 min.

11. A transparent conductive structure, comprising:
a transparent conductive pattern made of a transparent conductive material; and
an insulating pattern provided on an identical layer as the transparent conductive pattern and being complementary with the transparent conductive pattern, and prepared by heating the transparent conductive material for a preset time period, wherein a crystal structure integrity of the transparent conductive material is destroyed under heating and the transparent conductive material is transformed into an insulating material.

12. The transparent conductive structure according to claim 11, wherein the transparent conductive material is a transparent conductive metal oxide.

13. The transparent conductive structure according to claim 12, wherein the transparent conductive metal oxide is indium tin oxide, indium zinc oxide, or indium gallium zinc oxide.

14. A substrate comprising a transparent conductive structure, the transparent conductive structure comprising:
- a transparent conductive pattern made of a transparent conductive material; and
- an insulating pattern provided on an identical layer as the transparent conductive pattern and being complementary with the transparent conductive pattern, and prepared by heating the transparent conductive material for a preset time period,
- wherein a crystal structure integrity of the transparent conductive material is destroyed under heating and the transparent conductive material is transformed into an insulating material.

15. The substrate according to claim 14, wherein the transparent conductive material is a transparent conductive metal oxide.

16. The substrate according to claim 14, wherein the substrate is a display substrate or a touch substrate.

* * * * *